Figure 3:
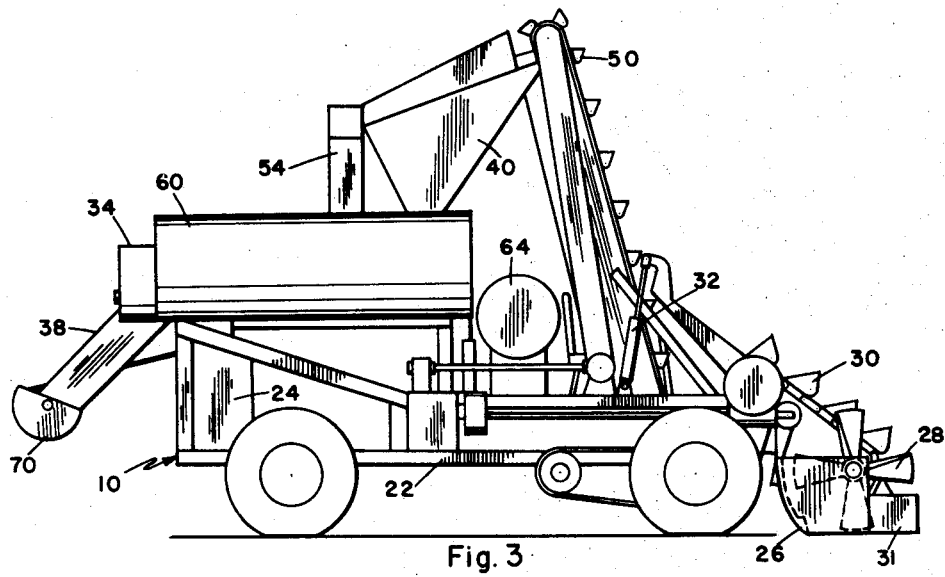

July 28, 1964     J. E. WEIR ETAL     3,142,105
MACHINE FOR MAKING ADOBE BLOCKS
Filed Oct. 30, 1961     3 Sheets-Sheet 1
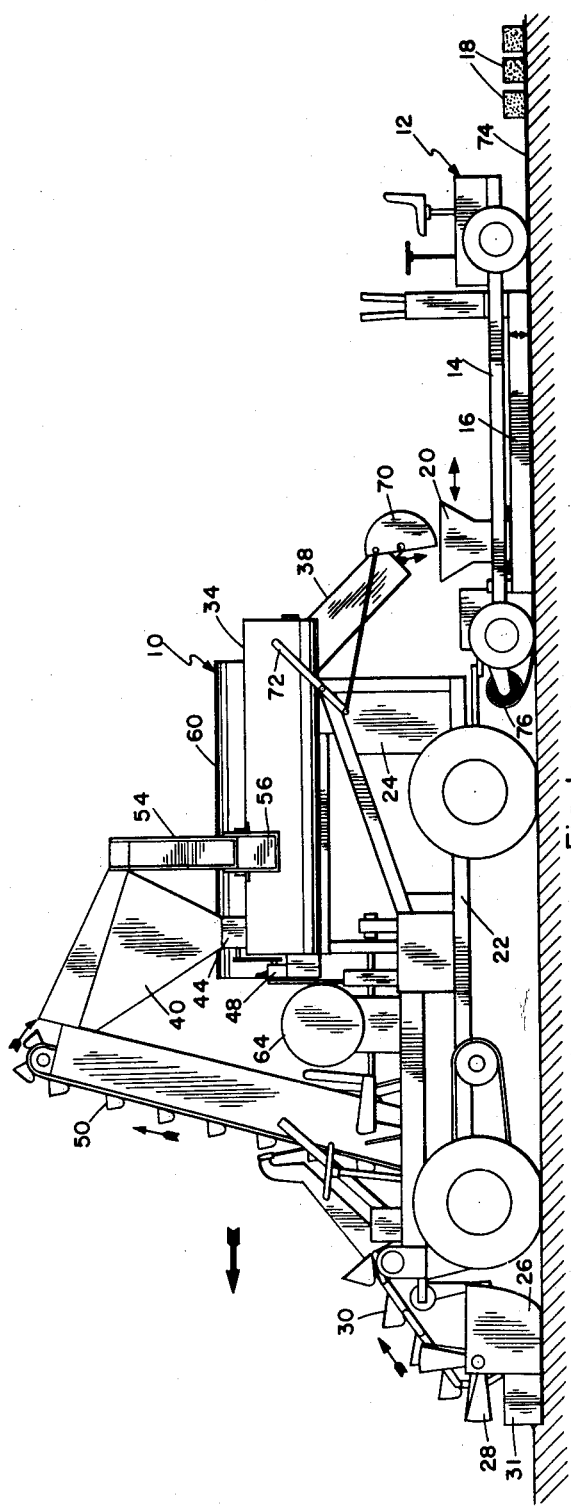
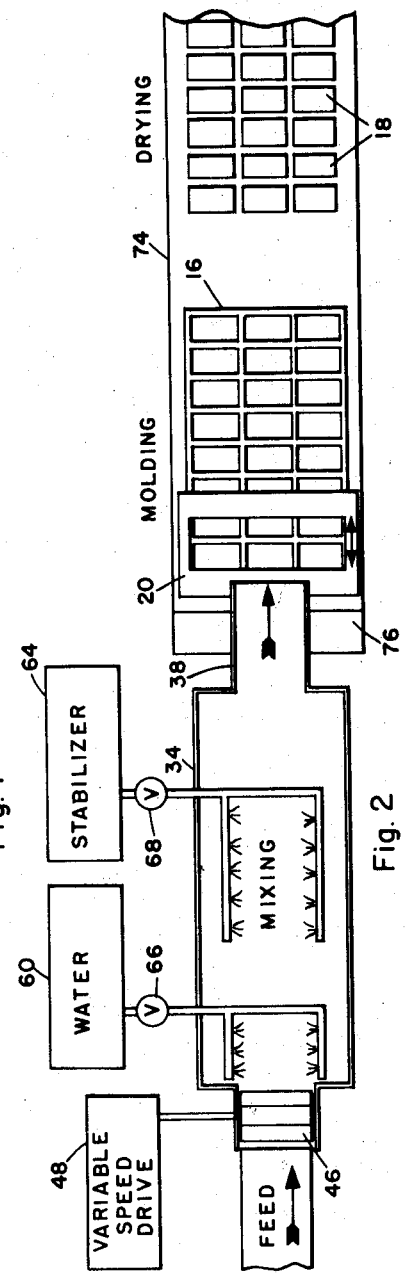
INVENTORS
JOHN E. WEIR
LAWRENCE W. WEIR
BY
*Knox & Knox*

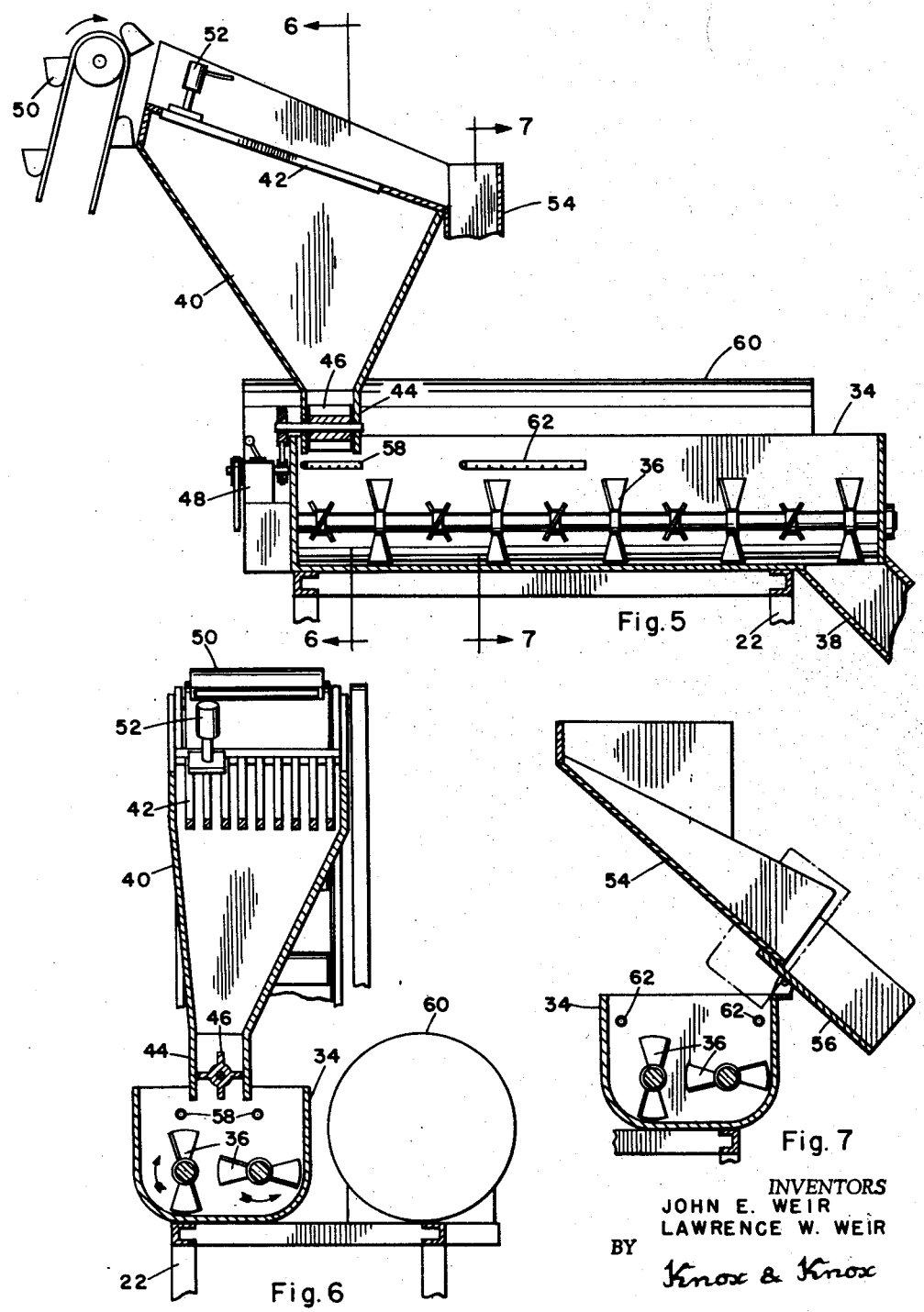

United States Patent Office 3,142,105
Patented July 28, 1964

3,142,105
MACHINE FOR MAKING ADOBE BLOCKS
John E. Weir, Rte. 1, Box 33, and Lawrence W. Weir, 1536 S. Escondido Ave., both of Escondido, Calif.
Filed Oct. 30, 1961, Ser. No. 148,532
1 Claim. (Cl. 25—2)

The present invention relates generally to brick and block making and more particularly to a machine for making adobe blocks.

*Background*

Sun dried adobe bricks or blocks are made primarily from certain types of soil and are low in cost, yet suitable for many types of construction. The soil should be of sandy loam composition and with low organic content, an excess of clay causing shrinkage and cracking, while too much sand results in crumbling. The soil is mixed with water to form a mud which is molded into bricks. To prevent erosion by rain, the mixture is usually waterproofed by a suitable stabilizer. A particularly suitable stabilizer is emulsified asphalt, used in accordance with a process developed by the American Bitumuls Company. Quality and building codes have been established for the composition of adobe blocks and the present application is not particularly concerned with the specific proportions of materials used.

Present methods of quantity production generally include the use of a fixed mixing plant to which materials are brought by conveyor or carrier, the mixed material then being taken in a "mud buggy," skip loader, or similar contrivance, to a molding apparatus which deposits molded blocks on a prepared surface. The operation involves considerable manpower and a number of machines to keep up the supply of mud at the proper rate to suit the capacity of the molding apparatus, and requires space for the machinery in addition to space for the blocks while drying, which may take several weeks.

*Objects and Drawings*

The primary object of this invention, therefore, is to provide a mobile and completely self-contained machine which will scoop up soil, carry out all necessary mixing to produce mud and feed the mud to a molding machine, which deposits finished blocks behind the machine on the smooth track prepared by the scoop portion of the apparatus.

Another object of this invention is to provide a block making machine in which the flow of ingredients is readily controllable to ensure accurate mixing and provide the proper quantity of mud to suit the capacity of the molding machine.

Another object of this invention is to provide a block making machine which will remove the top layer of soil from a prepared area and deposit blocks over virtually the entire area, with a minimum of wasted space.

A further object of this invention is to provide a block making machine which can feasibly be operated by one man.

Finally, it is an object to provide a block making machine of the aforementioned character which is simple and convenient to construct from readily available materials and which will give generally efficient and durable service.

Figure 4:
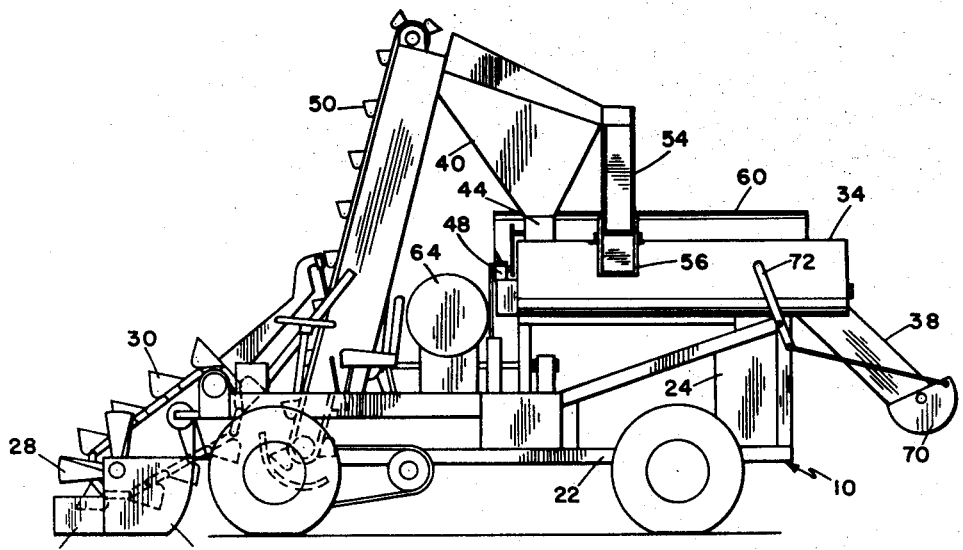

With these and other objects definitely in view, this invention consists in the novel construction, combination and arrangement of elements and portions, as will be hereinafter fully described in the specification, particularly pointed out in the claim, and illustrated in the drawings which form a material part of this disclosure, and in which:

FIGURE 1 is a side elevation view of the complete machine in operation;
FIGURE 2 is a diagrammatic top plan view of the operational sequence of the apparatus;
FIGURE 3 is a right side elevation view of the collecting and mixing portion of the machine;
FIGURE 4 is a left side elevation view thereof;
FIGURE 5 is an enlarged longitudinal sectional view of the mixing portion of the machine;
FIGURE 6 is a sectional view taken on the line 6—6 of FIGURE 5; and
FIGURE 7 is a sectional view taken on the line 7—7 of FIGURE 5.

*General Structure of Machine*

The complete apparatus as illustrated in FIGURE 1 includes a mixing machine 10, which has its own soil collecting means, and a molding machine 12. In this instance the molding machine 12 is of the type described in U.S. Patent No. 2,524,683 to Hans C. Sumpf and is towed behind the mixing machine. The molding machine has a wheeled frame 14 in which is mounted a vertically movable mold box 16, which is lowered to the ground while molding and then raised to deposit a set of molded blocks, indicated at 18. The mold box 16 is filled from a receiving hopper 20 which travels longitudinally in the frame 14 to distribute mud to the entire mold box, the operation being fully described in the above mentioned patent.

The mixing machine 10 is built on a self-propelled, wheeled frame 22 having an enclosed power unit 24 at the rear end. At the forward end is a scoop 26 in which is mounted a multiple bladed propeller 28 to move the collected soil inwardly to a central bucket conveyor 30. Side plates 31 are attached to both sides of scoop 26 to contain the soil and avoid the formation of ridges at the sides of the machine. The scoop 26 is pivotally mounted on frame 22 and can be raised or lowered by means of a hydraulic jack 32, the single power unit providing all necessary motive and equipment operating power. The various units are conventional and may vary in configuration. One available vehicle including all of the above described equipment is the Speedloader Model 54B, built by Pettibone Mulliken Corporation. This machine is equipped with the required operating controls and can be adapted to the present purpose with a minimum of modification.

Mounted on the rear portion of frame 22 is an elongated pug mill 34 containing a pair of counter-rotating, intermeshing screws 36 which mix the material and propel it to a rear delivery outlet 38 as in FIGURES 5–7. Above the forward end of the pug mill 34 is a large downwardly convergent hopper 40, at the top of which is a downwardly and rearwardly inclined grille or screed 42. The lower end of hopper 40 has a mouth 44 in which is a metering feeder 46, illustrated as a rotatable vaned drum, which meters the amount of material supplied to the pug mill. The metering feeder is driven through a speed changer 48 of any suitable type, so that the material flow can be closely controlled. The metering feeder and pug mill screws can be driven in any conventional manner from the power unit 24, the basic vehicle having existing power take-off means which facilitate connection of various machinery. Material picked up by the bucket conveyor 30 is raised to the hopper 40 by a conventional lifting conveyor 50, the arrangement being well known.

Secured to the screed 42 is a vibrator 52, which may be an air hammer or similar device, to vibrate the soil and separate rocks or hard lumps. At the rear end of the screed is a dump chute 54 extending to one side of the pug mill 34 to eject the separate rocks and lumps of soil which do not pass through the screed into hopper 40. A hinged extension 56 may be attached to the end of dump chute 54 to ensure that rejected material is thrown well clear of the machine.

Adjacent the hopper mouth 44 are spray bars 58 which are coupled to a water tank 60, the spray bars being arranged to spray from both sides the material dropped through the metering feeder 46. Spaced rearwardly from spray bars 58 are secondary spray bars 62 connected to a tank 64 containing a stabilizer, such as emulsified asphalt. Suitable valves, indicated at 66 and 68 in FIGURE 2, are used to control the flow of water and stabilizer.

Block Making Process

Only certain types of soil are suitable for making adobe blocks, a sandy loam being preferred. Before the actual block making the field must be prepared by general levelling and breaking up of lumps by means of a tooth harrow, ripper, disc cultivator, or the like. Also it is preferable that the soil have a slight initial moisture content, since this greatly improves mixing with the stabilizer. Thus the soil is irrigated about two days before block making and will then contain a suitable amount of moisture.

The block making machine is normally driven across the prepared field in parallel strips, leaving rows of blocks closely spaced. When initially starting, the scoop 26 is lowered by the jack 32 and the machine driven forward to scoop up the soil, a three inch-deep cut being adequate as indicated in FIGURE 1. The soil is picked up by the bucket conveyor 30 and fed to the lifting conveyor 50, which carries it to the top of hopper 40. Here the soil drops through the screen 42 into the hopper, except for hard lumps and rocks which are separated by the vibrator 52 and ejected from the dump chute 54. As the soil falls through the metering feeder 46, the spray bars 58 add the water necessary for proper mixing, in addition to the existing moisture content of the soil which merely ensures that the individual particles are thoroughly moistened. Without the pre-moistening, the water from the spray bars might not have time to moisten the soil completely in the initial part of the pug mill operation. The stabilizer is added from the spray bars 62 and the mud is mixed to the required consistency in the remainder of the pug mill 34, the action being indicated in FIGURE 2.

The flow of water and stabilizer is controlled by the operator, according to the speed of the machine, to obtain the correct mixture. To ensure proper mixing the speed of the metering feeder 46 can be varied, by means of speed changer 48, to control the amount of soil entering the pug mill. If the soil is very dry, the feed must be slow, but moist soil can be fed it at a faster rate. This variable metering of soil is an important factor in obtaining mud of the required consistency without having to change the speed of advance of the machine to any extent. Also, the controlled adjustability of the scoop 26 allows variation in the depth of cut to obtain the required intake of soil necessary to keep the machine properly supplied.

Mixed mud is supplied to the molding machine 12 through the delivery outlet 38, the flow being controlled by a shutter 70 which is operated by a suitable lever 72 on frame 22, the open position being indicated in FIGURE 1. The receiving hopper 20 spreads the mud in the mold box 16, which is then raised to deposit the molded set of blocks 18. During the molding stage the machine is, of course, stationary. To prevent contamination of the blocks by the ground soil, a protective strip 74 is laid under the molding machine from a roll 76 at the forward end thereof, the strip unrolling automatically as the machine advances. Paper has been used as a medium on which the blocks are deposited, but disintegrates from the moisture and must be discarded after one use. It has been found that plastic coated screen material is very satisfactory and can be re-rolled and used several times.

After one set of blocks has been deposited, the machine is driven forward a sufficient distance to clear the blocks and the molding step is repeated. Each time the machine moves forward the scoop 26 collects more soil, which is fed through the machine. While the machine is stationary, the conveyors, hopper and pug mill contain a sufficient quantity of material in transit to prevent any interruption in the supply of mixed mud. Since the blocks are deposited in the path left by the machine there is no obstruction to the machine's progress.

Advantages

The machine is completely self-contained and no areas need be set aside for mixing of mud or other preparations. Thus the entire area of prepared soil can be utilized with only sufficient clearance between batches of blocks to permit proper operation of the machine. All factors in the mixing of the mud are readily controllable, during the operation, to suit the consistency of the soil, the water, stabilizer and soil feed rate being individually adjustable.

The machine can be operated by one man. Each operation includes advancing the machine a short distance, then stopping forward motion for the molding step. While the machine is stopped, the operator is free to move around and actuate the various controls. If necessary, the controls of the molding machine can be extended to the mixing machine for convenience. Also a platform or catwalk can easily be added to the side of the mixing machine for access to the pug mill and mud delivery controls, such conventional features being omitted from the drawings for clarity.

It is understood that minor variation from the form of the invention disclosed herein may be made without departure from the spirit and scope of the invention, and that the specification and drawing are to be considered as merely illustrative rather than limiting.

We claim:

Apparatus for making adobe blocks, comprising:

a self-propelled mixing machine having soil pick-up means at the forward end thereof including vertically adjustable scoop, and a first conveyor receiving the soil from said scoop;

a hopper;

means in said hopper to separate and eject lumps and foreign matter from the soil;

lifting means to convey the soil from said pick-up means to said hopper comprising a second conveyor from said first conveyor to said hopper;

a pug mill mounted below said hopper;

variable speed metering means in said hopper to control the flow of soil into said pug mill;

water injecting spray bars in said pug mill below said metering means to moisten the soil entering the pug mill;

stabilizer injecting spray bars in said pug mill rearwardly of said metering means;

a block molding machine coupled to said mixing machine and having a mold for forming a plurality of blocks;

means for unrolling flexible material for deposit and drying of said blocks thereon; and delivery means extending from said pug mill to said mold.

References Cited in the file of this patent

UNITED STATES PATENTS

| | | |
|---|---|---|
| 276,991 | Anderson | May 8, 1883 |
| 889,920 | Forrester | June 9, 1908 |
| 952,488 | Wiggins | Mar. 22, 1910 |
| 2,191,419 | Bohmer et al. | Feb. 20, 1940 |
| 2,524,683 | Sumpf | Oct. 3, 1950 |
| 2,787,040 | Morelli et al. | Apr. 2, 1957 |